United States Patent Office 3,347,746
Patented Oct. 17, 1967

3,347,746
INJECTABLE SOLUTION OF AN AMINE SALT OF A RADIOPAQUE IODINATED ORGANIC ACID CONTAINING CALCIUM IONS
Hugo Holtermann, Baerum, and Sigbjorn Salvesen, Oslo, Norway, assignors to Nyegaard & Co., A/S, Oslo, Norway, a corporation of Norway
No Drawing. Filed Oct. 12, 1964, Ser. No. 403,356
Claims priority, application Great Britain, Oct. 23, 1963, 41,842/63
11 Claims. (Cl. 167—95)

This application is a continuation-in-part of application Serial No. 344,213, filed February 12, 1964, and now abandoned.

This invention concerns improvements in or relating to solutions for injection containing amine salts.

In earlier researches we have found that the presence of calcium and magnesium salts can be used to reduce the toxicity of certain injectable solutions containing sodium ions. In studies of sodium-containing solutions, and in particular of X-ray contrast media containing high concentrations of sodium salts of iodinated acids, we found that, when injected into the ear vein of a rabbit, sodium ions gave rise to pain and were toxic in appreciably lower doses than the corresponding N-methylglucamine salts. We also found, however, that addition of calcium and/or magnesium ions had a pronounced effect on the toxicity of such sodium solutions and the $LD_{50}$ value could, when calcium ions were added alone or together with magnesium ions, generally be raised to at least that of the N-methylglucamine salt solutions.

We also observed that when sodium and N-methylglucamine salts of iodinated acids were injected at relatively high concentration into the tail veins of mice, the amine salts then showed higher toxicity (lower $LD_{50}$ values) than the sodium salt solutions and the addition of calcium ions to the sodium salt solutions did not remove this difference. It was thus demonstrated that solutions of sodium salts with added calcium ion are not physiologically equivalent to N-methylglucamine salts under all circumstances and that the latter are rather more toxic than is generally supposed when injected by certain routes.

In further investigations we have now found that solutions of sodium salts and solutions of salts of amines such as N-methylglucamine both produce myocardial depression in perfused heart tests and that in both cases, such symptoms can be suppressed by addition of calcium ions. In these tests, rabbits were brought in light narcosis by intravenous injection of urethane, the heart removed and a glass canula inserted into the aorta. The heart, after being attached to a modified Langendorff's perfusion apparatus, was then perfused with a McEwen's perfusion solution (J. Physiol., 131, 678–689 (1956)) at a pressure so high that the aorta valves closed making the perfusion solution flow through the coronaries. The amplitude and frequency of the isolated rabbit's heart were recorded kymographically; all solutions to be studied were injected as rapidly as possible through the aorta canula and thus flowed very rapidly into the coronary vascular system.

When sodium salt solutions and N-methylglucamine and diethanolamine solutions of X-ray contrast agents were studied in this test it was found that all of them induce a myocardial depression sometimes leading to a transitory heart arrest, the depression or arrest in the course of 30–60 seconds being followed by a transitory increase above normal in amplitude as well as frequency.

It was further found that this pathological myocardial depression (and arrest) could be completely suppressed by adding Ca++ at suitable concentrations.

It is an object of the present invention to provide for use in medicine injectable solutions of amine salts of improved physiological compatibility.

According to the present invention therefore we provide injectable preparations for use in medicine comprising an aqueous solution of a parenterally injectable amine salt and a water-soluble calcium salt whereby the physiological compatibility of the amine salt is improved.

The pH of the preparation should be such that the greater part of the amine present is in salt form and should preferably of course, be within the range well tolerated on injection e.g. 5 to 8.

The invention is particularly applicable to the field of radiology, where it is common to employ large quantities of highly concentrated solutions of amine salts of iodinated acids especially salts of amino alcohols such as N-methylglucamine, ethanolamine and diethanolamine.

In the field of radiology, the amine salt, may, for example, be a salt of a polyiodo carboxylic acid such as 3,5-diacetamido-2,4,6-triiodobenzoic acid and its N-methyl and N,N'-dihydroxyethyl derivatives, 3-acetamido-5-propionamido-2,4,6-triiodobenzoic acid, 3,5-dipropionamido-2,3,6-triiodobenzoic acid, 3-acetamido-5-methylcarbamyl-2,4,6-triiodobenzoic acid, 3-acetamido-2,4,6-triiodobenzoic acid etc.

The amine salt may also be in admixture with other salts and in particular with sodium salts of iodinated acids, as in the mixed sodium and N-methyl glucamine salts of 3,5-diacetamido-2,4,6-triiodobenzoic acid which are commercially available as contrast agents. The inclusion of calcium ions is particularly useful where high concentrations of the amine salt are required, for example in urography and angiocardiography where concentrations of at least 0.3 M and often above 0.9 M or even 1.2 M are commonly used.

It should be noted that the preparations according to the invention should contain all their components in aqueous solution and that the anionic components cannot, therefore, be such that they precipitate calcium out of solution. Thus, for example, the calcium salt of N,N'-adipyl-di-(3-amino-2,4,6-triiodobenzoic acid) is insoluble and this acid or its salts, which are widely used in cholecystography, cannot be used in the present compositions. The compatibility of any given amine salt or mixture of salts with calcium ions can, of course, be readily ascertained either by reference to text books or other publications giving solubilities of calcium salts or by a preliminary trial. In some cases where the true solubility of the calcium salt in the medium is low, supersaturated solutions may have a sufficiently high degree of stability. In other cases sufficient solubility may be attained by using a mixture of amine or amine and sodium salts of two or more acids.

The concentration of calcium ions in the preparation required to counteract the effect of the amine salt will in general be between 0.02 mg. and 1.0 mg. Ca++ per ml. preferably above 0.1 and advantageously above 0.2 mg./ml. In radiological preparations where high concentrations of amine salts are used, the preferred range is 0.05 to 1.0 mg. Ca++ per ml., preferably above 0.1 and also preferably below 0.7 mg./ml.

It is also often found that there is an optimal value within the above range and, for example, in 76% solutions of the (N-methyl-glucamine-sodium salt (6.6:1) of 3,5-diacetamido-2,4,6-triiodobenzoic acid) which contains citrate (3 mg. sodium citrate per ml.) the optimal Ca++ concentration was found to be about 0.9 mg./ml. in the heart perfusion test; in a 60% N-methyl-glucamine salt solution of iophthalamic acid containing no sodium salt of the acid but some citrate (3 mg. of (trisodium citrate dihydrate) the optimal Ca++ concentration was about 0.7 mg./ml., while a similar preparation with no citrate added indicated an optimal $Ca^{++}$ concentration of about 0.1–0.2 mg. $Ca^{++}$/ml. In the acute toxicity test in mice the optimal $Ca^{++}$ concentration in a 60% N-methylglucamine salt solution of metrizoic acid was about 0.3–0.4 mg. $Ca^{++}$/ml. The high activity of $Ca^{++}$ in counteracting toxic effects of pure N-methylglucamine salt solutions of X-ray contrast agents in some tests indicates, that very minute amounts will have some effect in reducing toxicity.

The metal ions in the preparations must, of course, be in the completely free state and any calcium bound in complexes, for example, with chelating agents such as citric acid or ethylene diamine tetracetic acid, should not be included in calculating the above metal ion ratios. Such chelating agents are commonly added to radiological preparations, for example, to complex any heavy metal ions which may have been introduced during manufacture and which might be harmful to the stability of the preparations. It has been found for example that the presence of citrate increases the toxic effect in the perfused heart, and that higher concentrations of calcium ions are required to counteract the effect when citrate is present. This is due, however, to the chelating effect of citrate on $Ca^{++}$. The optimal concentration of calcium ions containing citrate in the usual amount (3 mg. of disodium hydrogen citrate dihydrate per ml.) will, however, fall within the limits indicated above.

The calcium ions can be incorporated into the preparations according to the invention as salts of the same acid as the amine salt or as water-soluble salts with other physiologically compatible anions such as halogen ions. It is often convenient to suspend calcium oxide or hydroxide in water with the amine base and neutralise with the required acid e.g. one of the above-described iodinated carboxylic acids.

The invention also comprises mixtures of substantially dry salts suitable for dissolution in a sterile aqueous medium to prepare the injectible preparations according to the invention.

For the better understanding of the invention the following examples are given by way of illustration only:

EXAMPLE 1

One hundred millilitres of an aqueous solution containing 52 g. of N-methylglucammonium metrizoate, 8 g. of sodium metrizoate, 0.3 g. of trisodium citrate·5½ $H_2O$ and 0.04 g. of disodium ethylenediamintetracetate ($Na_2$-EDTA) were prepared in the usual way.

Calcium chloride dihydrate (0.32 g. $CaCl_2 \cdot 2H_2O$) was added and dissolved by shaking at room temperature. After the solution had become quite clear, pH was adjusted to between 7.0 and 7.5 by the addition of dilute sodium hydroxide (or, if necessary, hydrochloric acid). The solution was filled into ampoules which were sealed and autoclaved for 20 minutes at 120° C.

The medium of 60% strength thus prepared contains 0.9 mg. $Ca^{++}$.

EXAMPLE 2

One hundred millilitres of an aqueous solution containing 66 g. of N-methylglucammonium diatrizoate, 10 g. of sodium diatrizoate, 0.3 g. of trisodium citrate·5½ $H_2O$ and 0.04 g. of disodium ethylene diaminetetracetate ($Na_2$-EDTA) was prepared in the usual way. Calcium chloride dihydrate (0.32 g.) was dissolved and pH adjusted as described in Example 1 and the solution ampouled and autoclaved.

The medium of 76% strength thus prepared contains 0.9 mg. $Ca^{++}$ per ml.

EXAMPLE 3

*Preparation of a solution containing 80 mg. sodium amidotrizoate, 28.5 mg. calcium amidotrizoate (0.9 mg. $Ca^{++}$) and 484 mg. N-methylglucammonium amidotrizoate pr. ml.*

Materials for 1 litre solution:

| | |
|---|---|
| 3,5 - diacetamido - 2,4,6 - triiodobenzoic acid (amidotrizoic acid) _____g__ | 472.0 |
| N-methylglucamine _____g__ | 116.6 |
| Calcium oxide (96%) _____g__ | 1.313 |
| Sodium hydroxide solution 5 N _____ml__ | 25 |
| Ca-$Na_2$-EDTA (91%) _____g__ | 0.440 |
| Trisodium citrate·5½ $H_2O$ _____g__ | 3.00 |
| Charcoal _____g__ | 3.0 |
| Water (redistilled pyrogenefree) about 730 ml. to make 1 litre. | |

Method of preparation

The amidotrizoic acid is mechanically agitated in 650 ml. of water at 50–60° C. using a 2-litre round bottom flask fitted with a glass stirrer. EDTA, sodium citrate, calcium oxide and N-methylglucamine are added, and the mixture is stirred until no more acid appears to dissolve. The remaining acid is titrated with the sodium hydroxide solution until dissolved. At a pH about 5.5 the charcoal is added and the mixture stirred at room temperature over night before being filtered through a Buchner filter. The volume is adjusted with water and pH brought to 7.5–7.6 with N/10 sodium hydroxide solution; and the solution is then filtered through a microporous filter (0.8µ) and ampouled under nitrogen. The ampoules are sealed and autoclaved for 20 minutes at 120° C. The total concentration of the three salts of amidotrizoic acid present is 59% w./v.

EXAMPLE 4

*60% w./v. N-methylglucammonium metrizoate containing 0.30 mg. $Ca^{++}$/ml.*

Materials for 10 litres of solution:

| | |
|---|---|
| N-methyl-3,5-diacetamido - 2,4,6 - triiodobenzoic acid _____g__ | 4580 |
| N-methylglucamine _____g__ | 1394 |
| Calcium oxide (96%) _____g__ | 4.38 |
| Ca-$Na_2$-EDTA (91%) _____g__ | 3.20 |
| Charcoal _____g__ | 30.0 |
| Water (redistilled, pyrogenfree) about 7.3 litres to make 10 litres. | |

Method of preparation

The metrizoic acid is mechanically well suspended in 6.5 litres of water at 50–60° C. using a 20-litre round bottom flask fitted with a stainless steel stirrer. EDTA, calcium oxide and N-methylglucamine (in portions) are added and the solution stirred over night at room temperature before being filtered through a Buchner filter. The volume in adjusted with water and the pH brought to 7.5–7.6 with small amounts of N-methylglucamine by stirring. The solution is filtered through a microporous filter (0.8µ) using compressed nitrogen, ampouled under nitrogen and the ampoules sealed and autoclaved for 20 minutes at 120° C.

EXAMPLE 5

*60% w./v. N-methylglucammonium iothalamate containing 0.35 mg. $Ca^{++}$/ml.*

Materials for 1 litre solution:

| | |
|---|---|
| 5 - acetamido - 2,4,6 - triiodo-N-methylisophthalamic acid (iothalamic acid) ____g__ | 455.0 |
| N-methylglucamine _____g__ | 141.1 |
| Calcium oxide (96%) _____g__ | 0.511 |
| Ca-$Na_2$-EDTA (91%) _____g__ | 0.120 |
| Sodium biphosphate _____g__ | 0.150 |
| Charcoal _____g__ | 3.0 |
| Water (redistilled, pyrogenfree) about 730 ml. to make 1 litre. | |

Method of preparation

The solution was made up, ampouled and autoclaved according to the method of Example 3.

The microporous filter used was, however, of the vacuum type and a minor adjustment of volume due to evaporation was therefore necessary. A correction of the pH after the filtration proved to be unnecessary because of the phosphate buffer present.

The compositions of the invention are used to visualize parts of the human body by injecting them into the body, preferably administering 10 g. to 100 g. of the amine salt of the radiopaque iodinated organic acid.

We claim:

1. A parenterally injectable X-ray contrast composition containing all of its components in aqueous solution, comprising a salt of a radiopaque iodinated organic acid with an amine selected from the group consisting of N-methylglucamine, ethanolamine and diethanolamine and from 0.02 to 1.00 mg./ml. of calcium ions.

2. A composition as defined in claim 1 in which said organic acid is a polyiodocarboxylic acid.

3. A composition as defined in claim 2 in which said salt is an N-methyl glucamine salt.

4. A composition as defined in claim 3 in which said polyiodocarboxylic acid is selected from the group consisting of 3-acetamido-5-propionylamido-2,4,6-triiodobenzoic acid, 3,5-diacetamido-2,4,6-triiodobenzoic acid, 3,5-dipropionylamido-2,4,6-triiodobenzoic acid, 3-acetamido-5-methylcarbamyl-2,4,6-triiodobenzoic acid, N,N'-di(hydroxyethyl)-3,5-diacetamido-2,4,6-triiodobenzoic acid, N-methyl-3,5-diacetamido-2,4,6-triiodobenzoic acid and 3-acetamido-2,4,6-triiodobenzoic acid.

5. A composition as defined in claim 4 in which the concentration of said salt is from 0.3 M to 1.2 M.

6. A composition as defined in claim 4 in which said solution contains at least 0.05 mg./ml. of calcium ions.

7. A composition as defined in claim 4 in which said solution contains at least 0.2 mg./ml. of calcium ions.

8. A composition as defined in claim 4 in which said solution contains at least 0.5 mg./ml. of calcium ions.

9. A composition as defined in claim 4 in which said solution contains no more than 0.7 mg./ml. of calcium ions.

10. A method of visualizing parts of the human body comprising injecting into the human body an X-ray contrast composition containing all of its components in aqueous solution, said composition comprising a salt of a radiopaque iodinated organic acid with an amine selected from the group consisting of N-methylglucamine, ethanolamine and diethanolamine and from 0.02 to 1.00 mg./ml. of calcium ions.

11. A method as defined in claim 10 in which from 10 g. to 100 g. of said salt are injected.

References Cited
UNITED STATES PATENTS

| | | | |
|---|---|---|---|
| 2,132,351 | 10/1938 | Dorgbach et al. | 167—52.5 |
| 2,268,915 | 1/1942 | Wastl et al. | 167—52.5 |
| 2,820,814 | 1/1958 | Ginsberg | 167—95 X |
| 2,921,884 | 1/1960 | Nachod et al. | 167—95 X |
| 3,009,952 | 11/1961 | Larsen | 167—95 X |
| 3,033,757 | 5/1962 | Hallett | 167—95 |
| 3,175,952 | 3/1965 | Bird | 167—95 |

ALBERT T. MEYERS, *Primary Examiner.*

SAM ROSEN, *Examiner.*

V. C. CLARKE, *Assistant Examiner.*